(12) United States Patent
Atkins et al.

(10) Patent No.: US 9,782,022 B2
(45) Date of Patent: Oct. 10, 2017

(54) ADJUSTABLE FOOD SHIELD WITH DETENTS

(71) Applicant: Brass Smith LLC, Denver, CO (US)

(72) Inventors: Scott Atkins, Denver, CO (US); Andrew Padden, Denver, CO (US)

(73) Assignee: Brass Smith LLC, Denver, CO (US)

( * ) Notice: Subject to any disclaimer, the term of this patent is extended or adjusted under 35 U.S.C. 154(b) by 0 days.

(21) Appl. No.: 14/621,154

(22) Filed: Feb. 12, 2015

(65) Prior Publication Data

US 2016/0235222 A1     Aug. 18, 2016

(51) Int. Cl.
| | | |
|---|---|---|
| *A47F 9/00* | (2006.01) | |
| *A47F 10/06* | (2006.01) | |
| *F16M 11/10* | (2006.01) | |

(52) U.S. Cl.
CPC ............ *A47F 10/06* (2013.01); *F16M 11/10* (2013.01); *A47F 2010/065* (2013.01); *F16M 2200/024* (2013.01)

(58) Field of Classification Search
CPC .......... A47F 3/12; E05D 11/1078; F16C 11/10
USPC ................ 312/137; 16/329, 275; 403/94, 96
See application file for complete search history.

(56) References Cited

U.S. PATENT DOCUMENTS

| | | | |
|---|---|---|---|
| 54,248 A | 4/1866 | Eddy | |
| 90,297 A | 5/1869 | Perry | |
| 93,763 A | 8/1869 | Stoddard | |
| 147,362 A | 2/1874 | Boudren | |
| 255,123 A | 3/1882 | Starrett | |
| 257,646 A | 5/1882 | Beseler | |
| 502,601 A | 8/1883 | Anderson | |
| 517,677 A | 4/1884 | Bender | |
| 342,650 A | 5/1886 | Smith | |
| 369,143 A | 8/1887 | White | |
| 369,971 A | 9/1887 | Stillman | |
| 384,784 A | 6/1888 | Pihl | |
| 406,299 A | 7/1889 | Overpack | |
| 423,434 A | 3/1890 | Lotto | |
| 432,614 A | 7/1890 | Hendrick | |
| 462,319 A | 11/1891 | Leohner et al. | |
| 476,806 A | 6/1892 | Mauser | |

(Continued)

FOREIGN PATENT DOCUMENTS

WO        9850728 A1        11/1998

OTHER PUBLICATIONS

1 Guard Portable Brochure, accessed on or before Oct. 9, 2007, 1 page.

(Continued)

*Primary Examiner* — Matthew Ing
(74) *Attorney, Agent, or Firm* — Kilpatrick Townsend & Stockton LLP

(57) ABSTRACT

An adjustable food shield includes a pair of support columns, a pair of rotation and detent mechanisms, a top shelf resting on and attached to the top ends of the support columns, a pair of rotation arms. One of the rotation arms is coupled respectively to each of the rotation and detent mechanisms, such that the rotation arms are rotatable about an axis generally parallel with a lengthwise dimension of the adjustable food shield. The rotation and detent mechanisms provide detents at a number of angular positions of the rotation arms. The adjustable food shield further comprises a shield panel fixed to the rotation arms.

6 Claims, 7 Drawing Sheets

(56) References Cited

U.S. PATENT DOCUMENTS

| | | |
|---|---|---|
| 546,081 A | 9/1895 | Reyer |
| 551,358 A | 12/1895 | Benecke |
| 554,459 A | 2/1896 | Rockwell |
| 555,025 A | 2/1896 | Ruffhead et al. |
| 557,575 A | 4/1896 | Gibson et al. |
| 560,879 A | 5/1896 | Williams |
| 566,360 A | 8/1896 | White |
| 568,649 A | 9/1896 | Whittington |
| 575,711 A | 1/1897 | Haley |
| 575,857 A | 1/1897 | Sly |
| 576,769 A | 2/1897 | Williams |
| 577,974 A | 3/1897 | Williams |
| 578,014 A | 3/1897 | Homan |
| 581,991 A | 5/1897 | Homan |
| 585,406 A | 6/1897 | Rhind |
| 596,689 A | 1/1898 | Aungst |
| 596,762 A | 1/1898 | Sevison |
| 597,947 A | 1/1898 | Bragger |
| 599,467 A | 2/1898 | Beardsley |
| 600,642 A | 3/1898 | Hartman |
| 621,374 A | 3/1899 | Rhind |
| 625,944 A | 5/1899 | White |
| 632,858 A | 9/1899 | Waibel |
| 642,906 A | 2/1900 | Hedgeland |
| 663,121 A | 12/1900 | Frost |
| 763,380 A | 6/1904 | Eble et al. |
| 767,484 A | 8/1904 | Maltby |
| 795,602 A | 7/1905 | Fyfe |
| 842,007 A | 1/1907 | Parker |
| 842,313 A | 1/1907 | Harrison |
| 903,593 A | 11/1908 | Lowendahl |
| 926,114 A | 6/1909 | Hall |
| 926,840 A | 7/1909 | Bagaason |
| 953,156 A | 3/1910 | Rasmussen |
| 959,099 A | 5/1910 | Anderson |
| 963,913 A | 7/1910 | Lyhne |
| 964,840 A | 7/1910 | Bernau |
| 970,751 A | 9/1910 | Pranke |
| 1,047,817 A | 12/1912 | Knight |
| 1,056,574 A | 3/1913 | Newton |
| 1,057,658 A | 4/1913 | Nichols |
| 1,074,272 A | 9/1913 | Kline |
| 1,094,272 A | 4/1914 | Thornley |
| 1,106,485 A | 8/1914 | Becker |
| 1,115,450 A * | 10/1914 | Parizek .............. E05D 11/1078 16/329 |
| 1,132,554 A | 3/1915 | Brett |
| 1,137,333 A | 4/1915 | Klorer |
| 1,178,072 A | 4/1916 | Hoag |
| 1,190,050 A | 7/1916 | Verba |
| 1,190,502 A | 7/1916 | Anderson |
| 1,206,871 A | 12/1916 | Locke |
| 1,207,270 A * | 12/1916 | Braithwaite ........ E05D 11/1078 16/275 |
| 1,217,838 A | 2/1917 | Schmidt |
| 1,227,258 A | 5/1917 | Godley |
| 1,231,635 A | 7/1917 | Nelson |
| 1,266,399 A | 5/1918 | Burtis |
| 1,286,352 A | 12/1918 | Kubat |
| 1,290,252 A | 1/1919 | Lester et al. |
| 1,303,249 A | 5/1919 | Brown |
| 1,303,345 A | 5/1919 | McFeaters |
| 1,303,981 A | 5/1919 | Stafford |
| 1,324,456 A | 12/1919 | Lutz |
| 1,328,930 A | 1/1920 | Stern |
| 1,342,626 A | 6/1920 | Frank |
| 1,345,157 A | 6/1920 | Francisco |
| 1,346,402 A | 7/1920 | Glaudel |
| 1,353,552 A | 9/1920 | Sweet |
| 1,354,873 A | 10/1920 | Bartley et al. |
| 1,356,213 A | 10/1920 | Loyd |
| 1,358,159 A | 11/1920 | Kern |
| 1,358,262 A | 11/1920 | Sumner |
| 1,358,422 A | 11/1920 | D'Esopo |
| 1,358,792 A | 11/1920 | Shogran |
| 1,359,645 A | 11/1920 | Zink |
| 1,371,703 A | 3/1921 | Miller |
| 1,372,492 A | 3/1921 | Doyle |
| 1,373,840 A | 4/1921 | Smith |
| 1,375,888 A | 4/1921 | Baer |
| 1,385,485 A | 7/1921 | Comrie |
| 1,386,565 A | 8/1921 | Glaudel |
| 1,389,053 A | 8/1921 | King |
| 1,389,901 A | 9/1921 | Rosenbluth |
| 1,389,935 A | 9/1921 | Carroll |
| 1,393,158 A | 10/1921 | Pawsat |
| 1,393,681 A | 10/1921 | Glaudel |
| 1,399,461 A | 12/1921 | Childs |
| 1,401,402 A | 12/1921 | Hawthorne |
| 1,403,863 A | 1/1922 | Peats |
| 1,408,834 A | 3/1922 | Seavey |
| 1,412,690 A | 4/1922 | Leuckert |
| 1,430,379 A | 9/1922 | Hubbell |
| 1,434,714 A | 11/1922 | McMullen |
| 1,435,310 A | 11/1922 | Kipper |
| 1,441,913 A | 1/1923 | Darling |
| 1,453,865 A | 5/1923 | Longenbaugh |
| 1,454,390 A | 5/1923 | Loranger |
| 1,460,313 A | 6/1923 | Davis |
| 1,461,289 A | 7/1923 | Primrose |
| 1,461,398 A | 7/1923 | McMullen |
| 1,465,213 A | 8/1923 | Feinberg |
| 1,470,553 A | 10/1923 | Church |
| 1,488,986 A | 4/1924 | Hood |
| 1,489,934 A | 4/1924 | Eklund |
| 1,490,304 A | 4/1924 | Zink |
| 1,493,609 A | 5/1924 | Dailey |
| 1,494,033 A | 5/1924 | Stevens |
| 1,503,357 A | 7/1924 | Ensign |
| 1,503,638 A | 8/1924 | Cooper |
| 1,504,767 A | 8/1924 | Hodny |
| 1,507,094 A | 9/1924 | Schoenborn |
| 1,512,291 A | 10/1924 | McGuire |
| 1,515,867 A | 11/1924 | Masone |
| 1,522,476 A | 1/1925 | Albright |
| 1,527,998 A | 3/1925 | Serpico |
| 1,538,340 A | 5/1925 | Hodny |
| 1,547,794 A | 7/1925 | Curry |
| 1,558,641 A | 10/1925 | Short |
| 1,574,899 A | 3/1926 | Kellogg |
| 1,580,316 A | 4/1926 | Moreton |
| 1,590,562 A | 6/1926 | Blonigen |
| 1,597,943 A | 8/1926 | Wilhelm |
| 1,628,623 A | 5/1927 | Jonnes |
| 1,706,215 A | 3/1929 | Davidson |
| 1,721,271 A | 7/1929 | Du Prel |
| 1,732,534 A | 10/1929 | Riches |
| 1,735,212 A | 11/1929 | Pawsat |
| 1,737,214 A | 11/1929 | Brown |
| 1,745,695 A | 2/1930 | Hunter |
| 1,793,911 A | 2/1931 | Dann |
| 1,814,500 A | 7/1931 | Summerbell |
| 1,835,473 A | 12/1931 | Davidson |
| 1,849,001 A | 3/1932 | Fisher |
| 1,936,529 A | 6/1932 | Taylor |
| 1,941,032 A | 12/1933 | Knowles |
| 1,989,691 A | 2/1935 | Hirt |
| 2,010,058 A | 8/1935 | Carlson |
| 2,038,906 A | 4/1936 | Ruhland |
| 2,066,699 A | 1/1937 | Skelton |
| 2,073,089 A | 3/1937 | Autenrieth |
| 2,074,247 A | 3/1937 | Armstrong |
| 2,124,006 A | 7/1938 | Parker |
| 2,163,859 A | 6/1939 | Ver Bockel |
| 2,177,921 A | 10/1939 | Zofrey |
| 2,220,429 A | 11/1940 | Soderberg |
| 2,257,169 A | 9/1941 | Hopps |
| 2,258,175 A | 10/1941 | Coleman |
| 2,287,890 A | 6/1942 | Legassey |
| 2,289,422 A | 7/1942 | Grotnes |
| 2,290,874 A | 7/1942 | Graff |
| 2,315,132 A | 3/1943 | Powers |
| 2,331,132 A | 10/1943 | Nadelson |
| 2,338,124 A | 1/1944 | Martinek |

(56) References Cited

U.S. PATENT DOCUMENTS

| | | | |
|---|---|---|---|
| 2,360,482 A | 10/1944 | Evans | |
| 2,365,935 A | 12/1944 | Boggs | |
| 2,370,748 A | 3/1945 | O'Donnell | |
| 2,433,550 A | 12/1947 | Graham | |
| 2,456,505 A | 12/1948 | Hastings | |
| 2,488,222 A * | 11/1949 | Morgan | A47B 39/04 |
| | | | 16/363 |
| 2,511,509 A | 6/1950 | Keck | |
| 2,548,650 A | 4/1951 | Brandt | |
| 2,596,627 A | 5/1952 | Wahnish | |
| 2,609,938 A | 9/1952 | Wells | |
| 2,635,345 A | 4/1953 | Samborski | |
| 2,651,725 A | 9/1953 | McFarland | |
| 2,696,996 A | 12/1954 | Engelhardt | |
| 2,719,691 A | 10/1955 | Vance | |
| 2,733,035 A | 1/1956 | Rocheleau | |
| 2,741,497 A | 4/1956 | Risley | |
| 2,767,003 A | 10/1956 | Gilmont | |
| 2,786,015 A | 2/1957 | Kampa | |
| 2,899,772 A | 8/1959 | Paulsen et al. | |
| 3,026,162 A | 4/1960 | Waszkiewicz | |
| 2,970,798 A | 2/1961 | Fritchle et al. | |
| 3,069,189 A | 12/1962 | Hollaender | |
| 3,081,869 A | 3/1963 | Hoskins | |
| 3,096,109 A | 7/1963 | Callahan | |
| 3,113,791 A | 12/1963 | Frost et al. | |
| 3,118,695 A | 1/1964 | Engelhardt | |
| 3,126,100 A | 3/1964 | Christensen | |
| 3,126,191 A | 3/1964 | Holden | |
| 3,160,349 A | 12/1964 | Kent | |
| 3,212,713 A | 10/1965 | Culver | |
| 3,237,899 A | 3/1966 | Lewis | |
| 3,265,434 A | 8/1966 | Bolotin | |
| 3,269,683 A | 8/1966 | Shinaver | |
| D206,198 S | 11/1966 | Molitor | |
| 3,389,882 A | 6/1968 | Schlosser | |
| 3,405,587 A | 10/1968 | Meazzi et al. | |
| 3,484,066 A | 12/1969 | Aunspaugh | |
| 3,499,679 A | 3/1970 | Olander | |
| 3,500,594 A | 3/1970 | O'Brien | |
| 3,581,354 A | 6/1971 | Usiskin | |
| 3,610,562 A | 10/1971 | Holmes et al. | |
| 3,640,498 A | 2/1972 | Aleks | |
| 3,734,439 A | 5/1973 | Wintz | |
| 3,738,606 A | 6/1973 | Mille | |
| 3,828,403 A | 8/1974 | Perrin et al. | |
| 3,837,383 A | 9/1974 | Ko | |
| 3,843,083 A | 10/1974 | Angibaud | |
| 3,921,539 A | 11/1975 | Berger | |
| 4,047,684 A | 9/1977 | Kobayashi | |
| 4,050,661 A | 9/1977 | Wooldridge | |
| 4,115,966 A | 9/1978 | DeLee | |
| 4,126,081 A | 11/1978 | Zdeb | |
| 4,132,178 A | 1/1979 | Mueller et al. | |
| 4,162,647 A | 7/1979 | Aslen | |
| 4,237,798 A | 12/1980 | Welsch et al. | |
| 4,286,897 A | 9/1981 | Suskind | |
| 4,307,864 A | 12/1981 | Benoit | |
| 4,338,875 A | 7/1982 | Lisowski | |
| 4,443,128 A | 4/1984 | Yamamoto et al. | |
| 4,452,416 A | 6/1984 | Templeton | |
| 4,483,334 A | 11/1984 | Murray | |
| 4,511,158 A | 4/1985 | Varga et al. | |
| 4,547,092 A | 10/1985 | Vetter et al. | |
| 4,624,374 A | 11/1986 | Murtaugh | |
| 4,672,898 A | 6/1987 | Davidson | |
| 4,729,535 A | 3/1988 | Frazier et al. | |
| 4,747,569 A | 5/1988 | Hoshino | |
| 4,799,444 A | 1/1989 | Lisowski | |
| 4,801,115 A | 1/1989 | Heard | |
| 4,821,382 A | 4/1989 | Puschkarski | |
| 4,860,909 A | 8/1989 | Leumi | |
| 4,884,927 A | 12/1989 | Menker | |
| 4,892,366 A | 1/1990 | Yerman | |
| 4,915,418 A | 4/1990 | Palatchy | |
| D309,540 S | 7/1990 | Suttles et al. | |
| 4,953,819 A | 9/1990 | Davis | |
| 4,964,603 A | 10/1990 | Yair | |
| 4,976,486 A | 12/1990 | Rifaat | |
| 5,002,247 A | 3/1991 | Dispenza et al. | |
| 5,023,755 A | 6/1991 | Rosenberg | |
| 5,056,854 A | 10/1991 | Rosen | |
| 5,111,956 A | 5/1992 | Jow | |
| 5,128,838 A | 7/1992 | Brandess | |
| D330,555 S | 10/1992 | Lilly | |
| D332,497 S | 1/1993 | Shufelt | |
| 5,199,680 A | 4/1993 | Rivera | |
| D337,462 S | 7/1993 | LaVaute et al. | |
| 5,259,582 A | 11/1993 | DeLange | |
| 5,301,999 A | 4/1994 | Thompson et al. | |
| 5,359,866 A | 11/1994 | Boddy | |
| 5,409,122 A | 4/1995 | Lazarus | |
| 5,427,344 A | 6/1995 | Beauchemin | |
| 5,449,138 A | 9/1995 | Ciancio | |
| 5,509,180 A | 4/1996 | Benetti et al. | |
| 5,551,660 A | 9/1996 | Leduchowski | |
| 5,566,911 A | 10/1996 | Hoshino | |
| 5,584,545 A | 12/1996 | LaVaute et al. | |
| 5,589,903 A | 12/1996 | Speggiorin | |
| 5,634,619 A | 6/1997 | Alessi | |
| 5,681,017 A | 10/1997 | Clausen | |
| 5,704,232 A | 1/1998 | Kuo | |
| 5,713,633 A * | 2/1998 | Lu | B60N 2/4844 |
| | | | 297/188.04 |
| 5,727,759 A * | 3/1998 | Christensen | A47C 7/68 |
| | | | 248/118 |
| 5,735,499 A | 4/1998 | Phillips et al. | |
| 5,746,334 A | 5/1998 | Brandenberg | |
| 5,775,652 A | 7/1998 | Crawshaw | |
| 5,782,743 A | 7/1998 | Russell | |
| 5,791,609 A | 8/1998 | Hankins | |
| 5,819,378 A | 10/1998 | Doyle | |
| 5,826,850 A | 10/1998 | Goldsmith | |
| 5,964,052 A | 10/1999 | Jepsen et al. | |
| 5,974,984 A | 11/1999 | Mitjans | |
| 6,061,939 A | 5/2000 | Gildea | |
| 6,093,878 A | 7/2000 | Hoshino | |
| 6,132,018 A | 10/2000 | McGrath | |
| 6,189,459 B1 | 2/2001 | DeAngelis | |
| 6,209,835 B1 | 4/2001 | Walrath et al. | |
| 6,274,797 B1 | 8/2001 | Liao | |
| 6,293,035 B1 | 9/2001 | LaPointe | |
| 6,328,269 B1 | 12/2001 | Krautloher | |
| 6,390,424 B1 | 5/2002 | Kidushim et al. | |
| 6,523,230 B1 | 2/2003 | Weinhold | |
| 6,536,996 B2 * | 3/2003 | Satran | B23C 5/1045 |
| | | | 407/113 |
| 6,554,238 B1 | 4/2003 | Hibberd | |
| 6,588,863 B1 | 7/2003 | Yatchak et al. | |
| 6,601,328 B1 | 8/2003 | Benaquista et al. | |
| 6,631,876 B1 | 10/2003 | Phillips | |
| 7,261,263 B2 | 8/2007 | Baker et al. | |
| 8,002,354 B2 * | 8/2011 | Chen | A47C 3/16 |
| | | | 297/378.1 |
| 8,308,249 B2 * | 11/2012 | Matus, Jr. | A47F 3/007 |
| | | | 312/137 |
| 8,403,430 B2 | 3/2013 | Atkins | |
| 2003/0057810 A1 | 3/2003 | DeWitt | |
| 2004/0226903 A1 | 11/2004 | Wang | |
| 2005/0097802 A1 | 5/2005 | Kim | |
| 2005/0251940 A1 | 11/2005 | Black | |
| 2006/0102818 A1 | 5/2006 | Carnevali | |
| 2007/0177754 A1 | 8/2007 | Kemmerer | |
| 2007/0236112 A1 | 10/2007 | Williman | |
| 2008/0029661 A1 | 2/2008 | Chen | |
| 2008/0164395 A1 | 7/2008 | Chang et al. | |
| 2009/0084019 A1 | 4/2009 | Carnevali | |
| 2009/0224122 A1 | 9/2009 | Liao | |
| 2011/0079692 A1 | 4/2011 | Li | |
| 2011/0169384 A1 | 7/2011 | Padden et al. | |
| 2014/0265775 A1 * | 9/2014 | Grziwok | F16M 11/041 |
| | | | 312/246 |

(56) References Cited

U.S. PATENT DOCUMENTS

OTHER PUBLICATIONS

2-D Adjustable Sneezeguard Brochure, accessed on or before Oct. 9, 2007, 2 pages.
Ambassador Angled Divider Specifications, accessed on or before Oct. 9, 2007, 2 pages.
Ambassador Angled Stationary Sneezeguard Specifications, accessed on or before Oct. 9, 2007, 2 pages.
Ambassador Vertical Divider Specifications, accessed on or before Oct. 9, 2007, 2 pages.
Ambassador Vertical Stationary Sneezeguard Specifications, accessed on or before Oct. 9, 2007, 2 pages.
Angled Divider Stationary Sneezeguard Specifications, accessed on or before Oct. 9, 2007, 2 pages.
Brass Smith, Inc. Brochure: A Guide to the Design and Use of the Decorative, User-Friendly Food Guard, Apr. 1998, 13 pages.
Bernstein Display: Bravo, accessed Dec. 21, 2003, 6 pages.
Canadian Display Systems Inc., http://www.canadiandisplaysystems.com, accessed Oct. 5, 2007, 2 pages.
Canadian Display Systems Inc., Portable Sneezeguard—PSG 19, accessed Jun. 1, 2005, 2 pages.
Carlisle Food Service Products, Price List, 2006, 2 pages.
Carousel Sneezeguard Specifications, accessed on or before Oct. 9, 2007, 2 pages.
Custom Sneezeguard Form, accessed on or before Oct. 9, 2007, 1 page.
Declaration of Alan Levine, 1:07-cv-01778-MSK, Oct. 5, 2007, 4 pages.
Declaration of Michael Vogel, 1:07-cv-01778-MSK, Oct. 5, 2007, 2 pages.
Deco-Tech Model Deco-900, Adjustable Vertical Display Specifications, Kevry Corporation, accessed Jun. 1, 2003, 1 page.
Deco 900 Fully Adjustable Specifications, DECO-950, -965, -970, -901, Kevry Corporation, accessed on or before Oct. 9, 2007, 4 pages.
Deco-Tech Self-Serve Food Shield Portable Rev, 2.3 DECO-270, -271, -272, -273, Kevry Corporation, accessed May 2002, 5 pages.
Defendant Lawrence Metal Products, Inc.'s Response to Brass Smith's Implicit Request for Preliminary Injunction, 07-CV-01778-MSK-BNB, filed Oct. 8, 2007, 14 pages.
Fast-Guard Online Design and Specification, Premier Brass, http://www.premierbrass.com/, accessed on or before Oct. 9, 2007, 4 pages.
Flexaguard Portable Sneeze Guard, accessed on or before Oct. 9, 2007, 2 pages.
Flexaguard Portable Sneeze Guard, Specifications and, http://www.flexaguard.com/spec.html. accessed on or before Oct. 5, 2007, 2 pages.
Folding Portable Sneezeguard Installation Brochure and Specifications, accessed on or before Oct. 9, 2007, 2 pages.
Food Shields-Sneeze Guards, CafeProducts.com, accessed Aug. 16, 2003, 1 page.
Forms + Surfaces: Silhouette Railing System, Profile One Information System, accessed Dec. 21, 2003, 5 pages.
Front Mount Stationary Sneezeguard Brochure and Specifications, accessed on or before Oct. 9, 2007, 2 pages.
Hi-Profile Folding Portable Sneezeguard Brochure and Specifications, accessed on or before Oct. 9, 2007, 2 pages.

IKEA: Stolmen Mounting Fitting, accessed Nov. 9, 2003, 1 page.
Kevry Catalog Products, www.kevry.com, 2003, 3 pages.
Low Profile Folding Portable Sneezeguard Installation Brochure and Specifications, accessed on or before Oct. 9, 2007, 2 pages.
Plexus Maintenance Solutions Brochure, accessed on or before Oct. 9, 2007, 1 page.
Merchandise Products with Visplay Beam for Marlite-Gallery, accessed Dec. 21, 2003, 6 pages.
Mid-Mount Stationary Sneezeguard Brochure and Specifications, accessed on or before Oct. 9, 2007, 2 pages.
Moffat Range of Gantries Specifications 6/2 Issue 5, accessed on or before Oct. 9, 2007, 1 page.
Notice of Filing Corrected Exhibit G to Defendant Lawrence Metal Products, Inc.'s Response to Brass Smith's Implicit Request for Preliminary Injunction, 07-CV-01778-MSK-BNB, Oct. 9, 2007, 2 pages.
Product Information: Brass Smith, Inc.: Hospitality, Sep. 1999, 13 pages.
Product Information: Guard Information, accessed on or before Oct. 9, 2007, 2 pages.
Product Information: HAFELE Multi-Purpose Pole Mount System 5.106-5.107, accessed on or before Oct. 9, 2007, 2 pages.
Product Information: IKEA 2003 Holidays at Home, 3 pages.
Product Information: Moffat Bulk Food Regeneration Rolley Model VGEN 8 Air Product Information, accessed on or before Oct. 9, 2007, 1 page.
Product Information: RHO with pictures, accessed on or before Oct. 9, 2007, 3 pages.
Product Information: Unic Camionnette, accessed on Dec. 16, 2003, 1 page.
QBD Sneezeguard Kits Brochure, accessed on or before Oct. 9, 2007, 2 pages.
RHO, www.rho.ca, accessed Dec. 21, 2003, 7 pages.
Sampler Sneezeguard Brochure, accessed on or before Oct. 9, 2007, 3 pages.
Serpentine Sneezeguard Specifications, accessed on or before Oct. 9, 2007, 2 pages.
Signature Server Product Information, Access Breath Guard, Vollarth, accessed on or before Oct. 9, 2007, 1 page.
Sneezeguard Accessories Brochure, accessed on or before Oct. 9, 2007, 2 pages.
Sneezeguard Replacement Hardware Brochure, accessed on or before Oct. 9, 2007, 2 pages.
Sneezeguard Replacement Stands Brochure, accessed on or before Oct. 9, 2007, 4 pages.
Sneezeguards Specifications B-445, accessed on or before Oct. 9, 2007, 2 pages.
Storcart Accessories Brochure, accessed on or before Oct. 9, 2007, 2 pages.
Storcases Brochure, accessed on or before Oct. 9, 2007, 2 pages.
The Sneezeguard Storcart Specifications, accessed on or before Oct. 9, 2007, 2 pages.
Vieler International Bistro 1, accessed on or before Oct. 9, 2007, 1 page.
Vertical Divider Stationary Sneezeguard Specifications, accessed on or before Oct. 9, 2007, 2 pages.
Visual Store: Illico pole, profile one, accessed Dec. 21, 2003, 3 pages.
Wall Storage Units Specifications, accessed on or before Oct. 9, 2007, 2 pages.

* cited by examiner

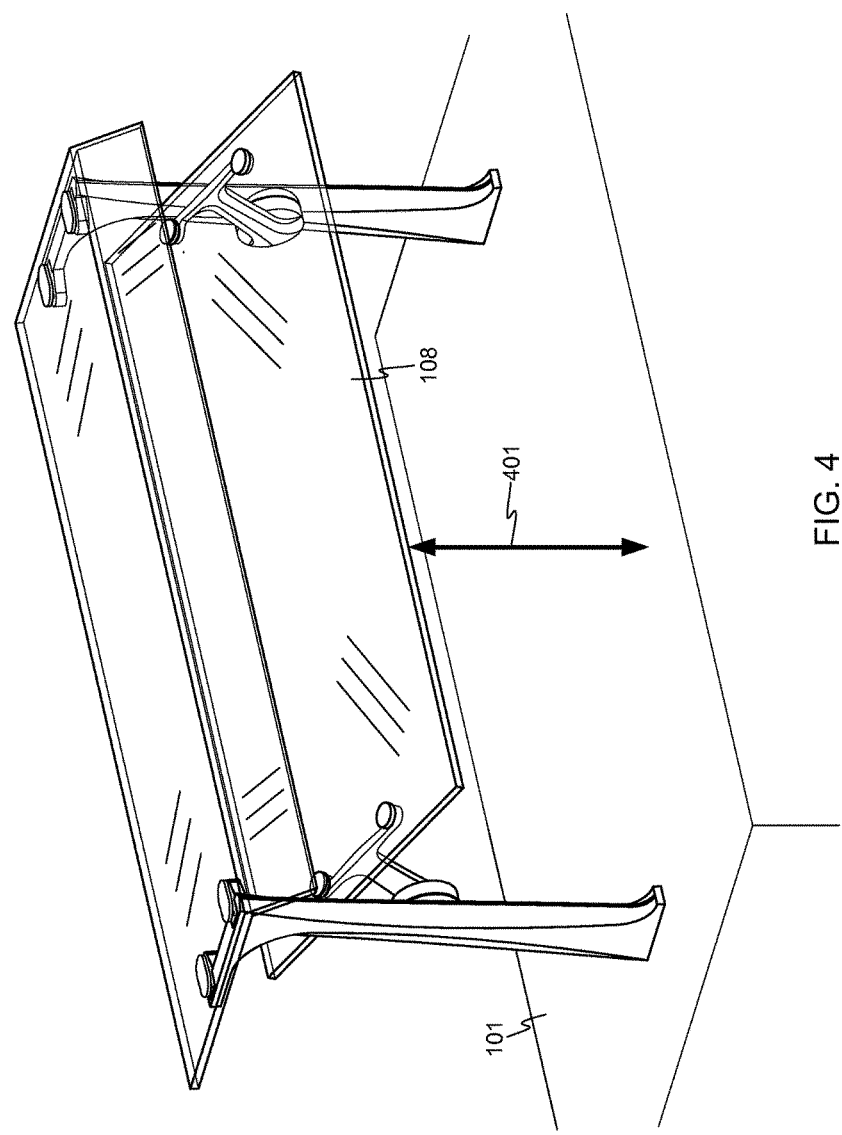

ADJUSTABLE FOOD SHIELD WITH DETENTS

BACKGROUND OF THE INVENTION

Food shields, also sometimes called sneeze guards, are used in a variety of settings. Typically, a clear panel is suspended over a buffet, smorgasbord, salad bar, retail display, or other kind of food display to protect the food from falling debris or other contamination. One or more panels may also be placed between the displayed food and customers, such that the customers must reach under the food shield to have access to the food, and the opportunities for contamination are limited.

Various health and safety codes and independent design guidelines may specify the required position of the food shield in relation to the food display. Because food shields are used in many different locations, it is desirable that a food shield be easily adjustable, so that it can be adapted to different spaces and uses. Some prior food shields are described in U.S. Pat. No. 6,588,863 to Yatchak et al., issued Jul. 8, 2003 and titled "Sneeze Guards and Methods for Their Construction", the entire disclosure of which is hereby incorporated herein by reference for all purposes. While the sneeze guards described in that patent have proven very useful, even more adjustability and configurability are desirable. Other prior food shields are described in U.S. Patent Application Publication No. 2011/0169384 of Padden et al., filed published Jul. 14, 2011 and titled "Food Shield", and U.S. Pat. No. 8,403,430 to Atkins, issued Mar. 26, 2013 and titled "Adjustable Food Shield", the disclosures of which are hereby incorporated herein by reference for all purposes.

BRIEF SUMMARY OF THE INVENTION

According to one aspect an adjustable food shield comprises a pair of support columns, one at each end of the adjustable food shield. Each support column has a top end and a bottom end and includes features for affixing the support column to a surface at the bottom end of the support column. Each support column also includes an integral feature near the midpoint between the top and bottom ends for coupling to a rotation and detent mechanism. The adjustable food shield further comprises a pair of rotation and detent mechanisms, one of the rotation and detent mechanisms coupled respectively to the integral feature of each support column. The adjustable food shield further comprises a top shelf resting on and attached to the top ends of the support columns, the top shelf having a front edge and a back edge. The adjustable food shield further comprises a pair of rotation arms. One of the rotation arms is coupled respectively to each of the rotation and detent mechanisms, such that the rotation arms are rotatable about an axis generally parallel with a lengthwise dimension of the adjustable food shield. The rotation and detent mechanisms provide detents at a number of angular positions of the rotation arms. The adjustable food shield further comprises a shield panel fixed to the rotation arms. In some embodiments, the top shelf includes a main portion made of glass and a downwardly-angled lip made of glass, the main portion and the downwardly-angled lip being bonded together at their common edge. In some embodiments, the rotation and detent mechanisms limit the angular travel of the rotation arms and shield panel, and the shield panel can reach at least a horizontal orientation under the top shelf, and a vertical orientation near and below the front edge of the top shelf. In some embodiments, the detent mechanisms provide detents for the horizontal orientation of the shield panel, the vertical orientation of the shield panel, and at least one intermediate orientation of the shield panel between the horizontal and vertical orientations. In some embodiments, the adjustable food shield further comprises at least one retractable locking pin configured to lock the rotation and detent mechanisms at each of the detent positions. In some embodiments, each rotation and detent mechanism comprises: a detent body of a shape and size to mount to the integral feature of the respective support column, the detent body defining a cavity and the detent body including a travel limiter protruding into the cavity, the travel limiter having two fixed travel limiting faces; a detent plate of a shape and size to nest and rotate within the cavity of the detent body, the detent plate having two limiting surfaces between which the travel limiter of the detent body is disposed, such that one of the two limiting surfaces engages a respective one of the fixed travel limiting faces of the detent body at each extreme of angular rotation of the arms, and the detent plate includes features for engaging a respective one of the arms such that the arm rotates with the detent plate; and one or more spring loaded ball plungers mounted in the detent body, each ball plunger positioned to engage a recess in the detent plate at each of the detent positions in the rotation of the arms.

According to another aspect, a rotation and detent mechanism comprises a body defining a cavity, the body having a travel limiter protruding into the cavity, and the travel limiter having two fixed faces. The rotation and detent mechanism further comprises a detent plate of a shape and size to nest and rotate within the cavity of the body. The detent plate has two limiting surfaces between which the travel limiter of the body is disposed. One of the two limiting surfaces engages a respective one of the fixed travel limiting faces of the body at each extreme of angular rotation of the detent plate, and the detent plate includes a plurality of recesses on a face perpendicular to the axis of the rotation of the detent plate. The rotation and detent mechanism further comprises one or more spring loaded ball plungers mounted in the body and aligned with the axis of rotation of the detent plate. Each ball plunger is positioned to engage a recess in the detent plate at each of certain angular positions of the detent plate within the body, such that the certain angular positions are detent positions. The rotation and detent mechanism further comprises an axle on which the detent plate rotates, the axle defining an axis of rotation of the detent plate. In some embodiments, the rotation and detent mechanism further comprises a shoulder screw that functions as the axle and constrains the detent plate axially with respect to the body, and a pair of thrust washers, one on each side of the detent plate. In some embodiments, the detent plate defines a hole for receiving a locking pin, the body defines a plurality of locking holes, and the hole in the detent plate aligns with one of the locking holes in the body at each of the detent positions of the detent plate, permitting insertion of a locking pin through the detent plate and into the body. In some embodiments, the detent plate further includes a geometric protrusion from a side opposite the body, for attachment of other elements.

BRIEF DESCRIPTION OF THE DRAWINGS

FIG. 4 illustrates the adjustable food shield of FIG. 1 in another alternate configuration.

DETAILED DESCRIPTION OF THE INVENTION

Figure 1:
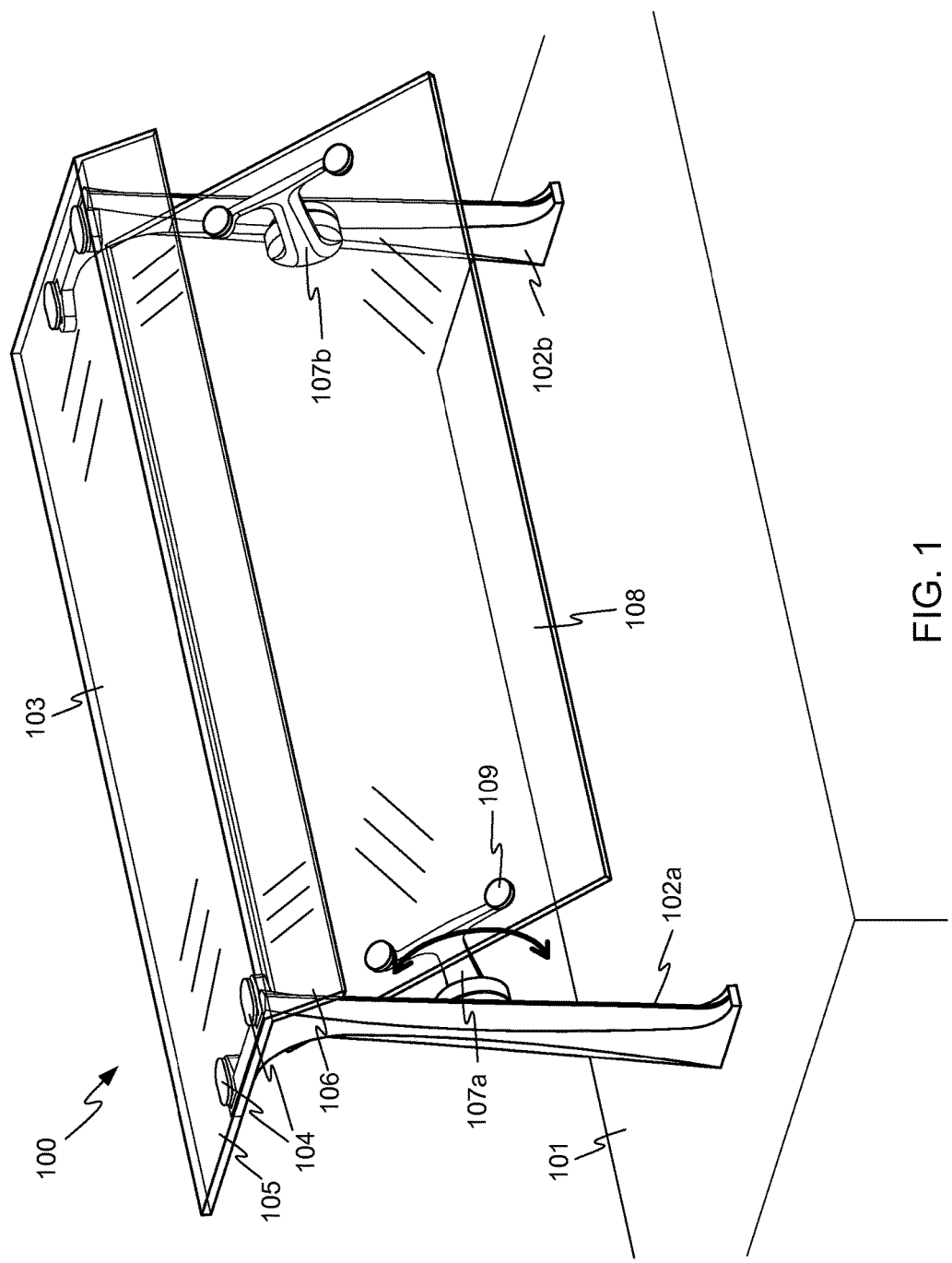
FIG. 1 shows an adjustable food shield in accordance with embodiments of the invention.

FIG. 1 shows an adjustable food shield 100 in accordance with embodiments of the invention. Example food shield 100 is mountable to a surface 101, which may be for example a surface of a buffet table, serving counter, or other installation where protection of items is desired. In the case of a food service installation, it may also be desired that the food items be attractively displayed and be visible, and in the case of a self-service buffet, customer access to the food items is necessary.

Food shield 100 includes two support columns 102a and 102b, one at each end of food shield 100. Preferably, support columns 102a and 102b include features for attaching them securely to surface 100. For example, support columns 102a and 102b may include threaded holes (not visible) in their bottom faces, to receive mounting bolts from below surface 101. Other mounting methods are also possible. Each of support columns 102a and 102b includes a bottom end at surface 101, and a top end opposite the bottom end. Support columns 102a and 102b may be made from any suitable material and formed in any suitable way, but may conveniently be die case from zinc or aluminum, and may be plated, painted, or otherwise decoratively finished.

A top shelf 103 rests on and is attached to the top ends of support columns 102a and 102b. Top shelf 103 may (but need not) be made of glass or another transparent material, and may be attached to support columns 102a and 102b by any convenient technique, for example by bolts through holes in top shelf 103 and threaded into support columns 102a and 102b. Such bolts may have decorative heads, or may be covered with decorative caps 104. Other fastening techniques may be used as well.

Top shelf 103 may function as a shelf, for example to display items placed on top of shelf 103, and also functions as a shield to protect the area below top shelf 103 from contamination that my fall from above. In some embodiments, top shelf 103 includes a horizontal main portion 105 and a downwardly-angled lip 106 joined to the front edge of main portion 105 shared with lip 106. The two portions may be made of glass, and may be bonded together, for example using an adhesive cured by ultraviolet light. Lip 106 may provide additional protection of the displayed items, and may assist in meeting food shield design guidelines as is explained in more detail below. Although other dimensions may be used, top shelf 103 may be disposed about 20 to 21 inches above surface 101.

Food shield 100 further includes a pair of rotation arms 107a and 107b, and a shield panel 108 fixed to the rotation arms 107a and 107b. Rotation arms 107a and 107b and shield panel 108 are rotatable as indicated in FIG. 1, about an axis defined by a pair of rotation and detent mechanisms (not visible in FIG. 1 but described in detail below). Rotation arms 107a and 107b may be made of any suitable material and may be made in any suitable way, but may conveniently be made using the same materials and finishes as support columns 102a and 102b. Shield panel 108 may be affixed to rotation arms 107a and 107b by any suitable technique, for example by bolts 109 through holes in shield panel 108 and threaded into rotation arms 107a and 107b. Bolts 109 may have decorative heads or may be covered by decorative caps, if desired.

Figure 2:
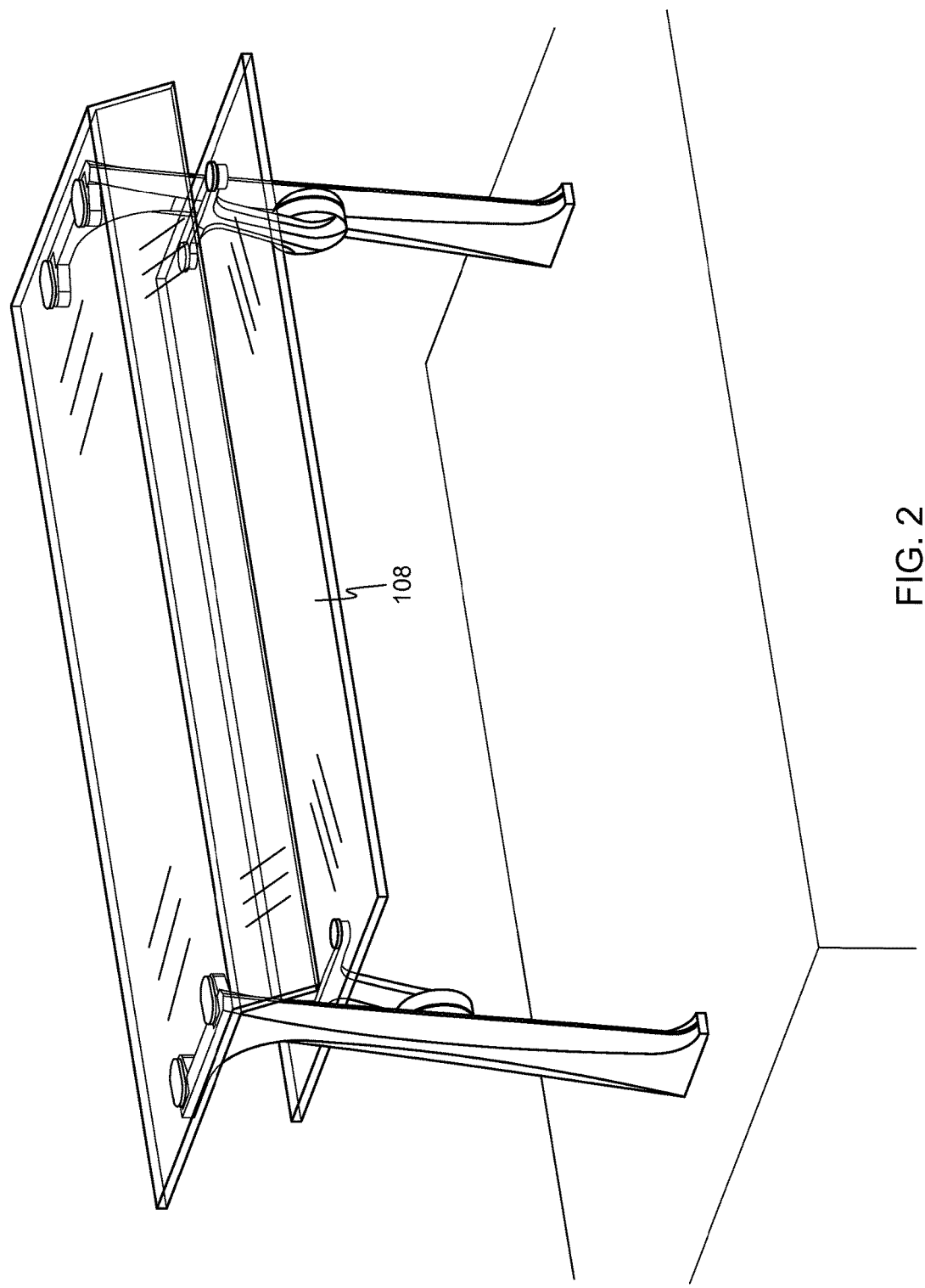
FIG. 2 illustrates the adjustable food shield of FIG. 1 in an alternate configuration.
Figure 3:
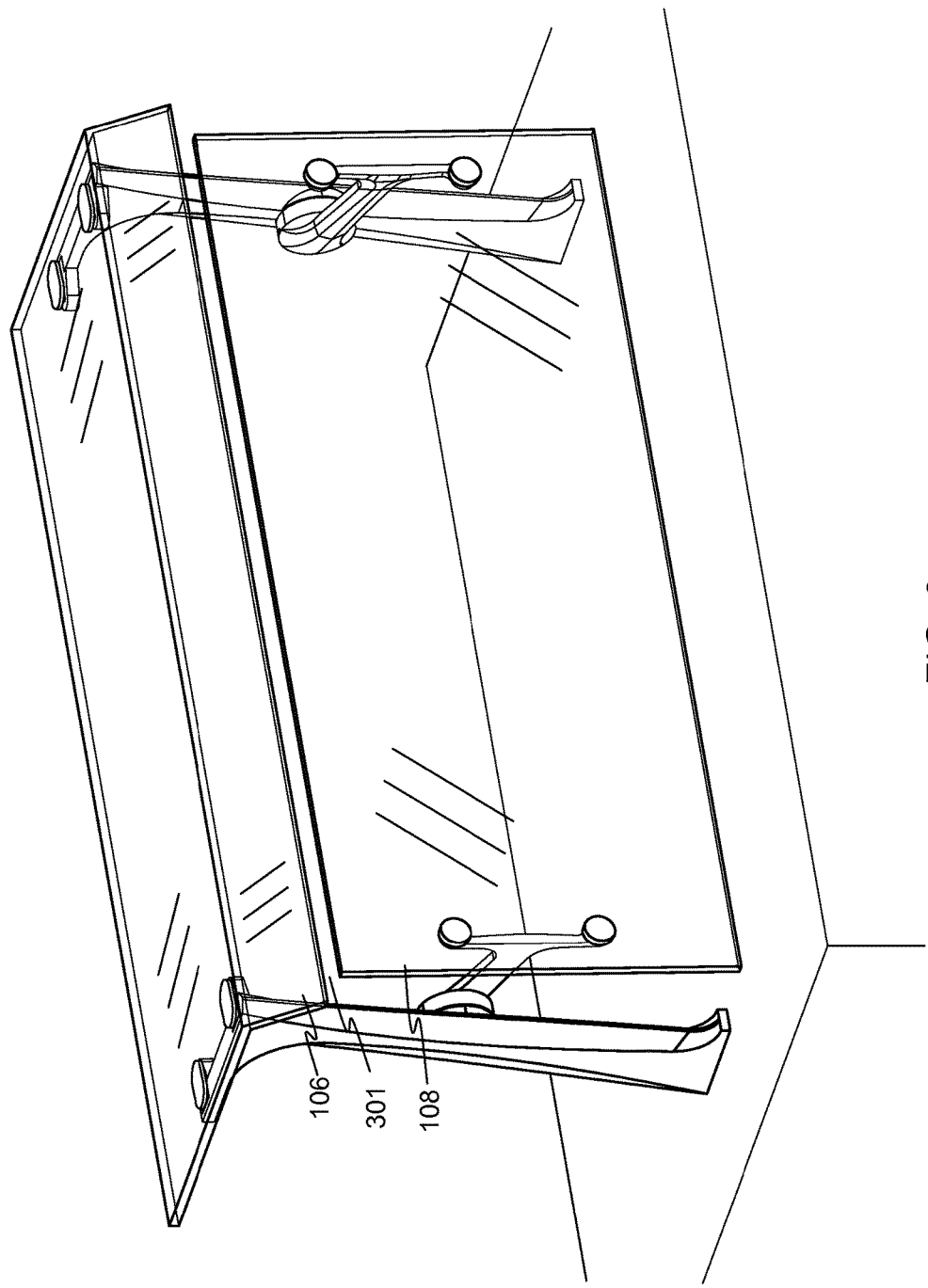
FIG. 3 illustrates the adjustable food shield of FIG. 1 in another alternate configuration.

Shield panel 108 can preferably reach at least a horizontal orientation under top shelf 103, as shown in FIG. 2, and a vertical orientation near and below the bottom edge of lip 106, as shown in FIG. 3. Preferably, the gap 301 remaining between lip 106 and shield panel 108 when shield panel 108 is in the vertical orientation is 0.75 inches or less across, in accordance with certain food shield design guidelines. Shield panel 108 may be made of glass or another transparent material when visibility of protected items is desired.

In addition to the orientation shown in FIG. 1, in which shield panel is at 45 degrees from horizontal or vertical, shield panel 108 can reach other intermediate orientations as well. For example, shield panel 108 may be placed in an intermediate orientation similar to that shown in FIG. 4, to allow customer access to buffet items or the like. In accordance with certain guidelines, the distance 401 from surface 101 to the lower edge of shield panel 108 may be about 13 inches. In the example embodiment of FIG. 4, this corresponds to placing shield panel 108 at about 22.5 degrees from horizontal, but other angles may be used, but the correct spacing to surface 101 may be achieved using different angles in other embodiments.

Figure 5A:
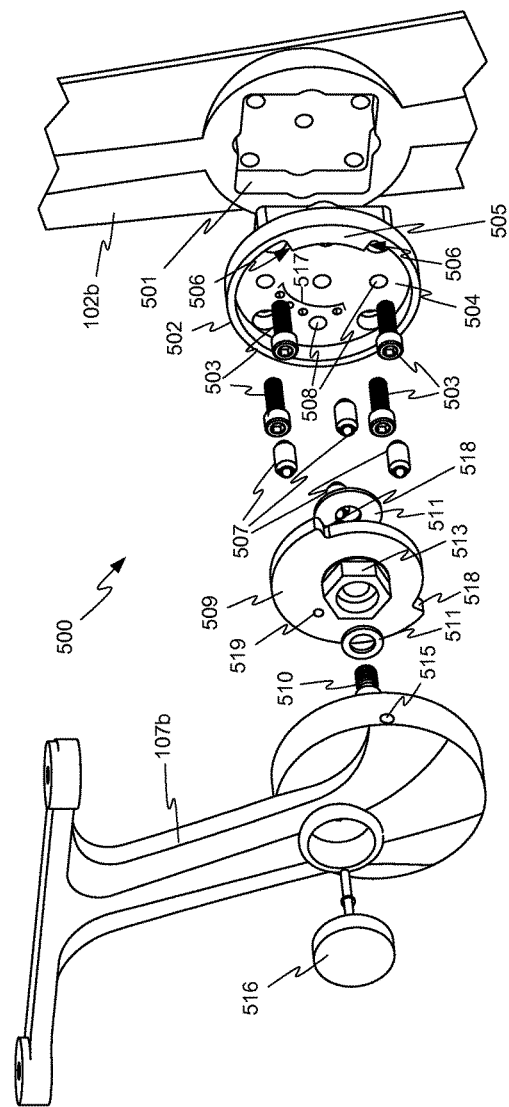
FIGS. 5A and 5B provide exploded perspective views from two different angles of a rotation and detent mechanism, in accordance with embodiments of the invention.
Figure 5B:
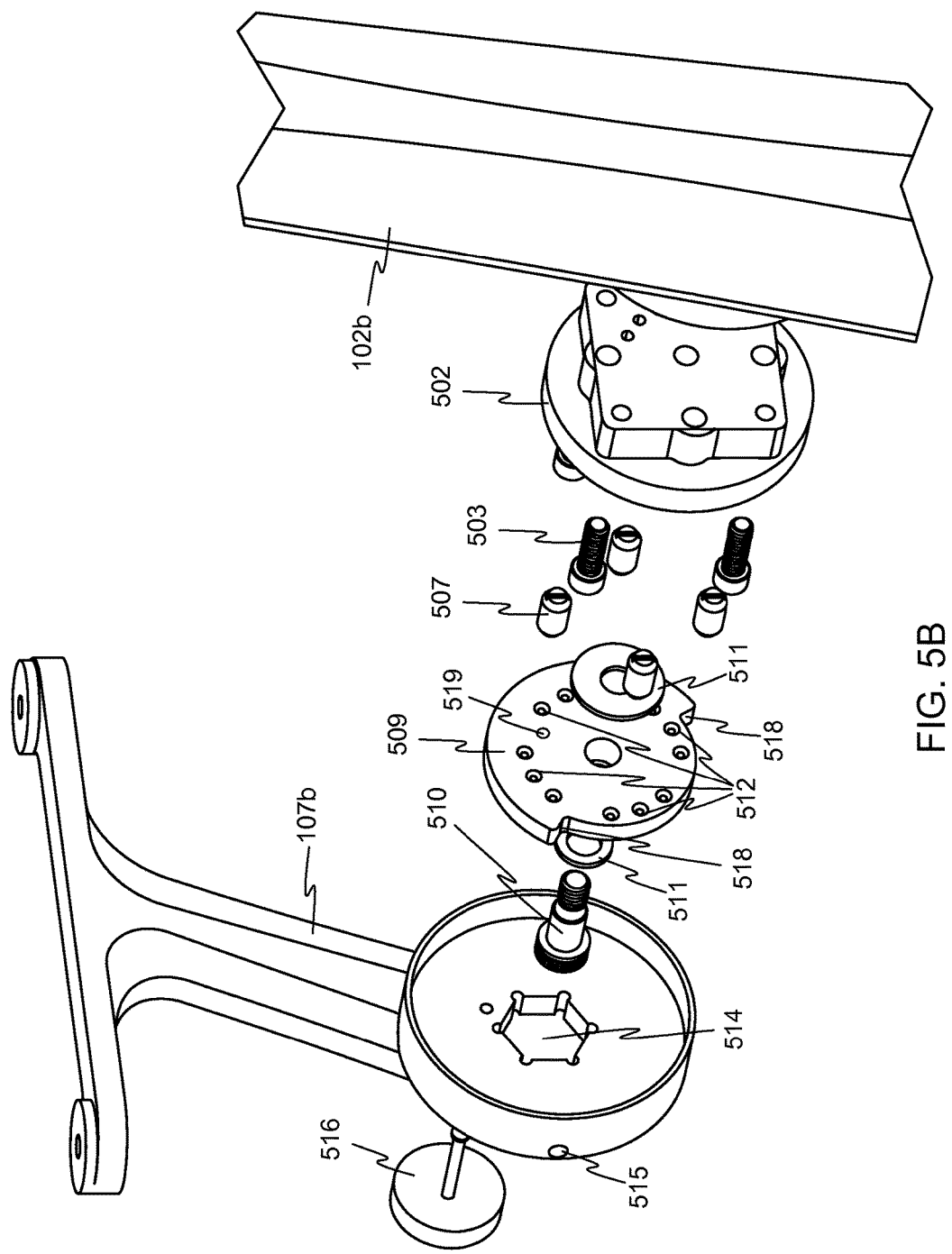

A pair of rotation and detent mechanisms is provided at the connections of rotation arms 107a and 107b to support columns 102a and 102b. FIGS. 5A and 5B provide exploded perspective views from two different angles of a rotation and detent mechanism 500, in accordance with embodiments of the invention.

As shown in FIG. 5A, support column 102b has an integral pocket 501 for coupling to rotation and detent mechanism 500. For example, pocket 501 may be formed during die casting of support column 102b. A detent body 502 attaches to support column 102b via bolts 503. Detent body 502 defines a cavity 504, which in this example is generally cylindrical, although this is not a requirement. Protruding into cavity 504 is a travel limiter 505, which has two fixed travel limiting faces 506. (Only edges of travel limiting faces 506 are visible in FIG. 5A.) Detent body 502 may be made of any suitable material and by any suitable process, but may conveniently be made using materials and processes similar to those used to make support column 102b.

One or more spring loaded ball plungers 507 are placed in holes 508 in detent body 502. As will be appreciated, detent body 502 remains stationary, attached to support column 102b and holding ball plungers 507.

A detent plate 509 is of a shape and size to rotate within cavity 504, on a shoulder screw 510 (best visible in FIG. 5B) that acts as an axle about which detent plate 509 rotates, and that defines the axis of rotation of detent plate 509. Thrust washers 511 may be used to minimize mechanical play between detent plate 509 and other components. Detent plate 509 includes a number of recesses 512 positioned to align with ball plungers 507 when shield panel 108 is in its respective detent positions. In FIG. 5B, four sets of three recesses 512 are shown, even though example food shield 100 can place shield panel 108 in four different detent positions. Some of recesses 512 can be used by different ball plungers, for example when shield panel 108 is in its vertical and horizontal orientations.

Detent plate 509 may be made of any suitable material and by any suitable process, but may conveniently be machined from steel or stainless steel, and may be hardened if desired.

Detent plate 509 also includes a geometric protrusion 513 (visible in FIG. 5A) of a size to mate with geometric recess 514 (visible in FIG. 5B) in rotation arm 107b. The nesting of geometric protrusion 513 and recess 514 helps prevent relative rotation between rotation arm 107b and detent plate 509. A setscrew (not shown) may also be inserted through hole 515 to bear on a surface of geometric protrusion 513, to hold rotation arm 107b to detent plate 509.

When rotation arm 107b and detent plate 509 reach one of the detent positions, ball plungers 507 fall into recesses 512, to hold rotation arm 107b and detent plate 509 in the detent position. The detent action of the ball plungers can be overcome by moderate force on rotation arms 107a and 107b or shield panel 108. A locking pin 516 may also be used, passing through detent plate 509 via hole 519 and engaging one of locking holes 517 in detent body 502, to lock the system in the detent position.

Detent plate 509 also includes two travel limiting surfaces 518 that respectively engage travel limiting faces 506 of detent body 502 at the extremes of travel of shield plate 108.

Figure 6:
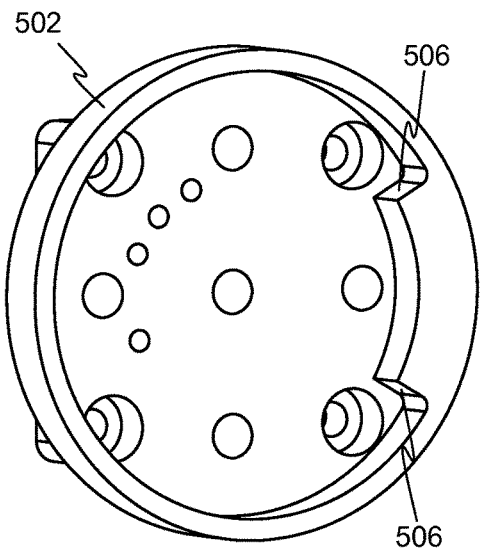
FIG. 6 illustrates a more detailed view of a detent body, in accordance with embodiments of the invention.
Figure 7A:
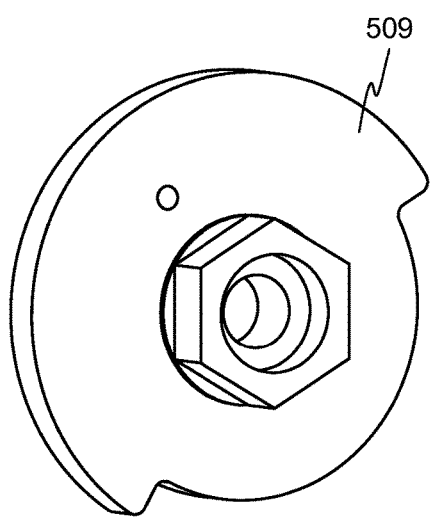
FIGS. 7A and 7B show more detailed views of a detent plate, in accordance with embodiments of the invention.
Figure 7B:
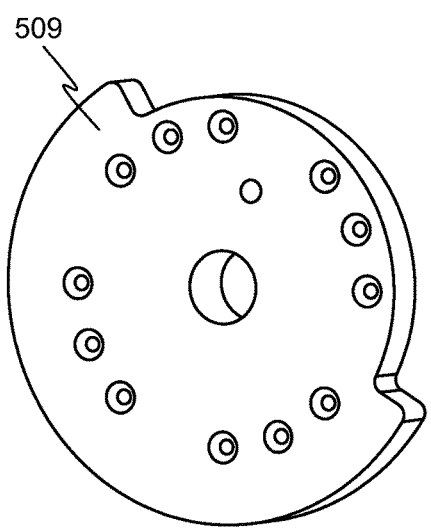

FIG. 6 illustrates a more detailed view of example detent body 502. In particular, travel limiting faces 506 are visible in FIG. 6. FIGS. 7A and 7B show more detailed views of example detent plate 509. It will be appreciated that in some embodiments, mirror image left- and right-handed versions of some parts may be provided, possibly including detent plate 509, support columns 102a and 102b, and rotation arms 107a and 107b. In other embodiments, identical versions of some or all of these parts may be usable at both ends of food shield 100.

Figure 8:
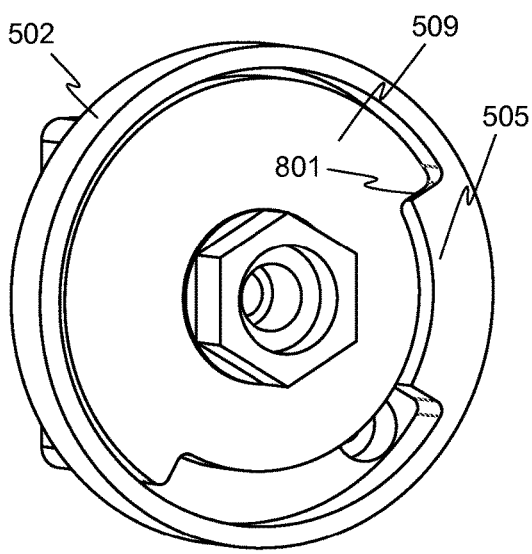
FIG. 8 illustrates the detent body of FIG. 6 and the detent plate of FIGS. 7A and 7B nested together as when assembled into the food shield of FIG. 1, in accordance with embodiments of the invention.

FIG. 8 illustrates detent body 502 and detent plate nested together as when assembled into food shield 100. In the configuration of FIG. 8, detent plate 509 is at one extreme of its travel, and has contacted travel limiter 505 at interface 801.

The invention has now been described in detail for the purposes of clarity and understanding. However, those skilled in the art will appreciate that certain changes and modifications may be practiced within the scope of the appended claims.

What is claimed is:

1. An adjustable food shield, comprising:
   a pair of support columns, one at each end of the adjustable food shield, each support column having a top end and a bottom end and including features for affixing the support column to a surface at the bottom end of the support column, and each support column defining an integral pocket formed in a side of the support column and positioned between the top and bottom ends for coupling to a rotation and detent mechanism;
   a pair of rotation and detent mechanisms, one of the rotation and detent mechanisms being at least partially housed within the integral pocket of each support column;
   a top shelf resting on and attached to the top ends of the support columns, the top shelf having a front edge and a back edge;
   a pair of rotation arms, one of the rotation arms coupled respectively to each of the rotation and detent mechanisms, such that the rotation arms are rotatable about an axis essentially parallel with a lengthwise dimension of the adjustable food shield, the rotation and detent mechanisms providing detents at a number of angular positions of the rotation arms; and
   a shield panel fixed to the rotation arms.

2. The adjustable food shield of claim 1, wherein the top shelf includes a main portion made of glass and a downwardly-angled lip made of glass, the main portion and the downwardly-angled lip being bonded together at their common edge.

3. The adjustable food shield of claim 1, wherein the rotation and detent mechanisms limit the angular travel of the rotation arms and shield panel, and wherein the shield panel can reach at least a horizontal orientation under the top shelf, and a vertical orientation below the front edge of the top shelf.

4. The adjustable food shield of claim 3, wherein the detent mechanisms provide detents for the horizontal orientation of the shield panel, the vertical orientation of the shield panel, and at least one intermediate orientation of the shield panel between the horizontal and vertical orientations.

5. The adjustable food shield of claim 4, further comprising at least one retractable locking pin configured to lock the rotation and detent mechanisms at each of the detent positions.

6. The adjustable food shield of claim 3, wherein each rotation and detent mechanism comprises:
   a detent body of a shape and size to mount at least partially within the pocket formed in the respective support column, the detent body defining a cavity and the detent body including a travel limiter protruding into the cavity, the travel limiter having two fixed travel limiting faces;
   a detent plate of a shape and size to nest and rotate within the cavity of the detent body, the detent plate having two limiting surfaces between which the travel limiter of the detent body is disposed, such that one of the two limiting surfaces engages a respective one of the fixed travel limiting faces of the detent body at each extreme of angular rotation of the arms, and the detent plate includes features for engaging a respective one of the arms such that the arm rotates with the detent plate; and
   one or more spring loaded ball plungers mounted in the detent body, each ball plunger positioned to engage a recess in the detent plate at each of the detent positions in the rotation of the arms.

* * * * *